(12) United States Patent
Naito et al.

(10) Patent No.: US 7,175,923 B2
(45) Date of Patent: Feb. 13, 2007

(54) OPTICAL INSTRUMENT

(75) Inventors: Tadaharu Naito, Nagano (JP);
Hirokazu Morozumi, Nagano (JP);
Mitsuo Ohyama, Ibaraki (JP); Mitsuru Yajima, Tokyo (JP); Kazuhiko Suda, Nagano (JP)

(73) Assignee: Kabushiki Kaisha Light Kohki Seisakusho, Nagano (JP)

( * ) Notice: Subject to any disclaimer, the term of this patent is extended or adjusted under 35 U.S.C. 154(b) by 48 days.

(21) Appl. No.: 10/829,845

(22) Filed: Apr. 22, 2004

(65) Prior Publication Data
US 2004/0234812 A1   Nov. 25, 2004

(30) Foreign Application Priority Data
May 23, 2003   (JP) .............................. 2003-146520

(51) Int. Cl.
*B32B 3/00* (2006.01)
(52) U.S. Cl. ..................................... 428/690
(58) Field of Classification Search ................ 428/690; 257/102, 103; 33/366; 356/251
See application file for complete search history.

(56) References Cited

U.S. PATENT DOCUMENTS

| | | | | |
|---|---|---|---|---|
| 1,302,353 A | | 4/1919 | Friedrich | |
| 3,121,163 A | * | 2/1964 | Rickert | 250/467.1 |
| 3,320,671 A | * | 5/1967 | Rickert et al. | 42/123 |
| 3,524,710 A | * | 8/1970 | Rickert | 356/251 |
| 4,038,547 A | * | 7/1977 | Hoesterey | 250/338.1 |
| 6,195,160 B1 | * | 2/2001 | Rainer et al. | 356/135 |

FOREIGN PATENT DOCUMENTS

| | | | |
|---|---|---|---|
| JP | 3-29910 | | 3/1991 |
| JP | 10-053762 | * | 2/1998 |

* cited by examiner

Primary Examiner—Rena Dye
Assistant Examiner—Camie S. Thompson
(74) Attorney, Agent, or Firm—Dennis G. LaPointe

(57) ABSTRACT

An optical instrument which has an optical system that includes an ocular lens and a reticle located in the optical system, wherein a phosphorescence pigment is applied to a surface of the reticle facing toward the ocular lens, and light irradiated from outside through the ocular lens excites the phosphorescence pigment of the reticle, The phosphorescence pigment contains at least one of a phosphorescence phosphor selected from $SrAl_2O_4$: Eu, Dy; $Sr_4Al_{14}O_{25}$: Eu, Dy; and $CaAl_2O_4$: Eu,Nd. The particle diameter of the phosphorescence pigment is no smaller than 1.5 µm and no greater than 10 µm at D50. The phosphorescence pigment is applied with a microscopic and sharp shape and thus improves visibility even in dark places. The phosphorescence pigment is applied in an amount that is no less than 1.2 mg/cm² and no more than 50 mg/cm². This obtains appropriate luminance and improves visibility even in dark places.

3 Claims, 7 Drawing Sheets

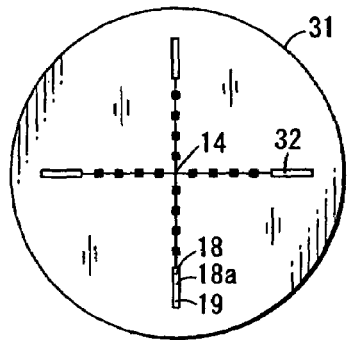
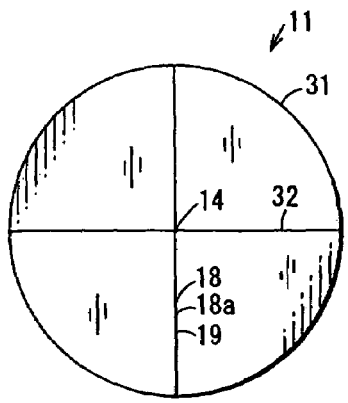
FIG. 9a  FIG. 9b
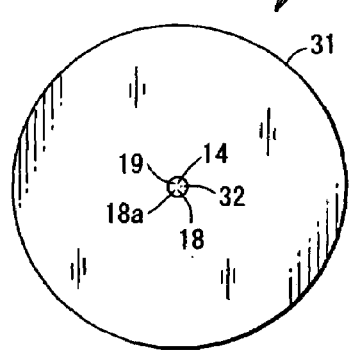
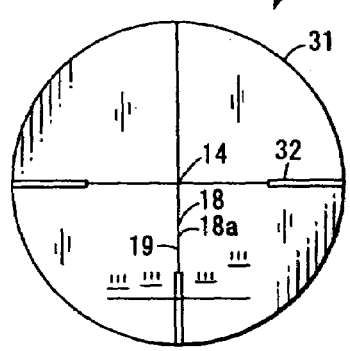
FIG. 9c  FIG. 9d
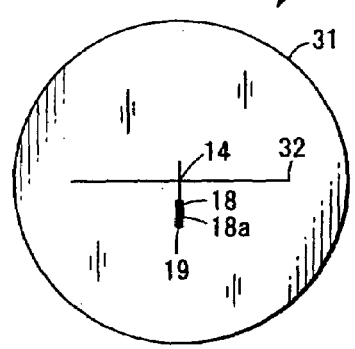
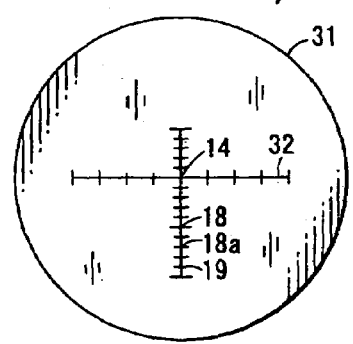
FIG. 9e  FIG. 9f
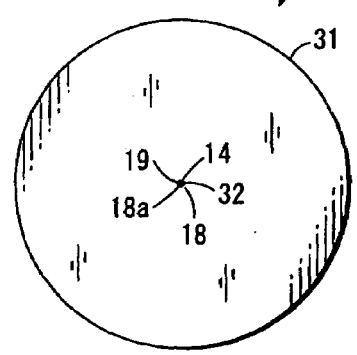
FIG. 9g

OPTICAL INSTRUMENT

FIELD OF THE INVENTION

The present invention relates to a reticle that is clearly visible in the dark, such as at dusk or in the nighttime, and an optical instrument using the same.

BACKGROUND OF THE INVENTION

Conventionally, a reticle has a cross-like pattern and is used as a sight in a targeting scope, such as a riflescope, to aim at a target. Furthermore, the reticle is used as a scale in an optical instrument, such as a monocular, a binocular, a surveying instrument, and a spotting scope, to determine the size and distance of an observed object.

Such a reticle may be produced by orthogonally crossing two thin wires in a cross-like manner, processing a metal plate or foil to form a cross-like pattern, using a groove or ink to mark a cross-like pattern on a transparent material such as a glass, or by using a half-mirror to project a cross-like pattern.

When an optical instrument having such a reticle is used in the dark, such as at dusk or in the nighttime, or used to aim at a target having a color with low luminosity, such as black, it becomes difficult to view the reticle.

In order to solve such a problem, Japanese Laid-Open Utility Model Publication No. 3-29910 (pages 6–7, FIG. 1) describes directly illuminating a reticle with a light source such as a lamp and projecting an optical image from a light source onto the reticle using a half-mirror. Furthermore, U.S. Pat. No. 1,302,353 (pages 1–2, FIGS. 1–7) describes applying a radium light-emitting substance to a groove formed in a glass plate or applying the radium light-emitting substance around a reticle.

However, when the light source, such as a lamp, is used, a power source, such as a battery, becomes necessary to light the light source in the optical instrument. This increases the size and weight of the optical instrument. Further, the lamp cannot be used when the power source drains.

Furthermore, when a light-emitting material containing radioactive substance, such as the radium light-emitting substance, is used, radioactive exposure to the radioactive substance may cause a problem. In addition, the disposal of such a radioactive substance may cause an environmental problem.

Furthermore, there are phosphorescence light-emitting substances that do not contain radioactive substances, such as zinc sulfide (ZnS), which are known in the related art. However, with zinc sulfide, the emission time after the removal of light, or the afterglow, is between several minutes and several tens of minutes and is thus very short. Therefore, such substances have little practicability.

There is another example that uses fluorescent dye. However, fluorescent dye does not emit light by itself and some sort of a light source becomes necessary. Thus, the same problem as in the example using the light source arises.

SUMMARY OF THE INVENTION

The present invention is an optical instrument which has an optical system that includes an ocular lens and a reticle located in the optical system, wherein a phosphorescence pigment is applied to a surface of the reticle facing toward the ocular lens, and light irradiated from outside through the ocular lens excites the phosphorescence pigment of the reticle. The reticle has a surface to which phosphorescence pigment is at least partially applied. The phosphorescence pigment contains at least one of a phosphor selected from $SrAl_2O_4$: Eu, Dy; $Sr_4Al_{14}O_{25}$: Eu, Dy; and $CaAl_2O_4$: Eu, Nd. The phosphorescence pigment has a particle diameter that is no smaller than 1.5 μm and no greater than 10 μm at D50. Since the phosphorescence pigment applied to the reticle contains at least one of a phosphor selected from $SrAl_2O_4$: Eu, Dy; $Sr_4Al_{14}O_{25}$: Eu, Dy; and $CaAl_2O_4$:Eu, Nd, light is emitted over a long period of time after being excited. Thus, satisfactory visibility is provided over a long period of time even in dark places without using a light source or a radioactive substance. In addition, since the phosphorescence pigment has a particle diameter that is no smaller than 1.5 μm and no greater than 10 μm at D50, that is, since the phosphorescence pigment has a particle diameter that is small and distributed within a certain narrow range, the phosphorescent pigment is applied to the reticle with an accurate and sharp shape to obtain a satisfactory outer appearance and improve visibility even in dark places. When the particle diameter of the phosphorescent pigment is smaller than 1.5 μm at D50, the particle diameter of the phosphorescence pigment is too small. This significantly reduces the luminance of the phosphorescent pigment and lowers visibility in, for example, a dark place. When the particle diameter of the phosphorescent pigment is greater than 10 μm at D50, the particle diameter of the phosphorescence pigment becomes coarse. Thus, the light-emitting surface becomes rough, and it becomes difficult to apply the phosphorescent pigment to the reticle with a microscopic and sharp shape. Further, irregularities appear at the periphery of the applied phosphorescent pigment, and the reticle becomes unclear. Therefore, when the particle diameter of the phosphorescent pigment is no smaller than 1.5 μm and no greater than 10 μm, the phosphorescence pigment is applied to the reticle with a microscopic and sharp shape to obtain a satisfactory outer appearance and improve visibility even in dark places.

Further, the present invention is a reticle having a surface to which phosphorescence pigment is at least partially applied. The phosphorescence pigment contains at least one of a phosphor selected from $SrAl_2O_4$: Eu, Dy; $Sr_4Al_{14}O_{25}$: Eu, Dy; and $CaAl_2O_4$: Eu, Nd. The phosphorescence pigment is applied in an amount that is no less than 1.2 mg/cm$^2$ and no more than 50 mg/cm$^2$. Since the phosphorescence pigment applied to the reticle contains at least one of a phosphor selected from $SrAl_2O_4$: Eu, Dy; $Sr_4Al_{14}O_{25}$: Eu, Dy; and $CaAl_2O_4$: Eu, Nd, light is emitted over a long period of time after being excited. Thus, satisfactory visibility is provided over a long period of time even in dark places without using a light source or a radioactive substance. In addition, since the phosphorescence pigment is applied in an amount that is no less than 1.2 mg/cm$^2$ and no more than 50 mg/cm$^2$, appropriate luminance of the light-emitting surface is obtained, and visibility is improved even in dark places. When the phosphorescent pigment is applied in an amount that is less than 1.2 mg/cm$^2$, the luminance of the light-emitting surface decreases and lowers visibility in, for example, dark places. When the phosphorescent pigment is applied in an amount that is more than 50 mg/cm$^2$, the luminance of the light-emitting surface saturates. Thus, there is no point in applying more than 50 mg/cm$^2$. Accordingly, by applying the phosphorescent pigment in an amount that is no less than 1.2 mg/cm$^2$ and no more than 50 mg/cm$^2$, visibility is improved even in dark places.

Further, the present invention is a reticle having a surface to which phosphorescence pigment is at least partially applied. The phosphorescence pigment contains at least one of a phosphor selected from $SrAl_2O_4$: Eu, Dy; $Sr_4Al_{14}O_{25}$: Eu, Dy; and $CaAl_2O_4$: Eu, Nd. The phosphorescence pigment has a particle diameter that is no smaller than 1.51 µm and no greater than 101 µm at D50. The phosphorescence pigment is applied in an amount that is no less than 1.2 mg/cm and no more than 50 mg/cm². Since the phosphorescence pigment applied to the reticle contains at least one of a phosphor selected from $SrAl_2O_4$: Eu, Dy; $Sr_4Al_{14}O_{25}$: Eu, Dy; and $CaAl_2O_4$: Eu, Nd, light is emitted over a long period of time after being excited. Thus, satisfactory visibility is provided over a long period of time even in dark places without using a light source or a radioactive substance. In addition, since the phosphorescence pigment has a particle diameter that is no smaller than 1.5 µm and no greater than 10 µm at D50, that is, since the phosphorescence pigment has a particle diameter that is small and distributed within a certain narrow range, the phosphorescent pigment is applied to the reticle with an accurate and sharp shape to obtain a satisfactory outer appearance and improve visibility even in dark places. When the particle diameter of the phosphorescent pigment is smaller than 1.5 µm at D50, the particle diameter of the phosphorescence pigment is too small. This significantly reduces the luminance of the phosphorescent pigment and lowers visibility in, for example, a dark place. When the particle diameter of the phosphorescent pigment is greater than 10 µm at D50, the particle diameter of the phosphorescence pigment becomes coarse. Thus, the light-emitting surface becomes rough, and it becomes difficult to apply the phosphorescent pigment to the reticle with a microscopic and sharp shape. Further, irregularities appear at the periphery of the applied phosphorescent pigment, and the reticle becomes unclear. Therefore, when the particle diameter of the phosphorescent pigment is no smaller than 1.5 µm and no greater than 10 µm, the phosphorescence pigment is applied to the reticle with a microscopic and sharp shape to obtain a satisfactory outer appearance and improve visibility even in dark places. Furthermore, since the phosphorescence pigment is applied in an amount that is no less than 1.2 mg/cm² and no more than 50 mg/cm², appropriate luminance of the light-emitting surface is obtained, and visibility is improved even in dark places. When the phosphorescent pigment is applied in an amount that is less than 1.2 mg/cm², the luminance of the light-emitting surface decreases and lowers visibility in, for example, a dark places. When the phosphorescent pigment is applied in an amount that is more than 50 mg/cm², the luminance of the light-emitting surface saturates. Thus, there is no point in applying more than 50 µg/cm². Accordingly, by applying the phosphorescent pigment in an amount that is no less than 1.2 mg/cm² and no more than 50 µg/cm², visibility is improved even in dark places.

The reticle is used in an optical instrument. This improves visibility of the reticle in optical instruments used in the dark, such as at dusk or in the nighttime, or in optical instruments used to observe dark-colored objects.

BRIEF DESCRIPTION OF THE DRAWINGS

FIG. 1 is a perspective view showing a reticle according to one embodiment of the present invention that includes a reticle base formed of metal or the like;

FIGS. 9(a) to 9(g) are front views each showing other examples of a reticle including a transparent base.

DETAILED DESCRIPTION OF THE PREFERRED EMBODIMENTS

One embodiment of the present invention will now be described with reference to the drawings.

Figure 1:
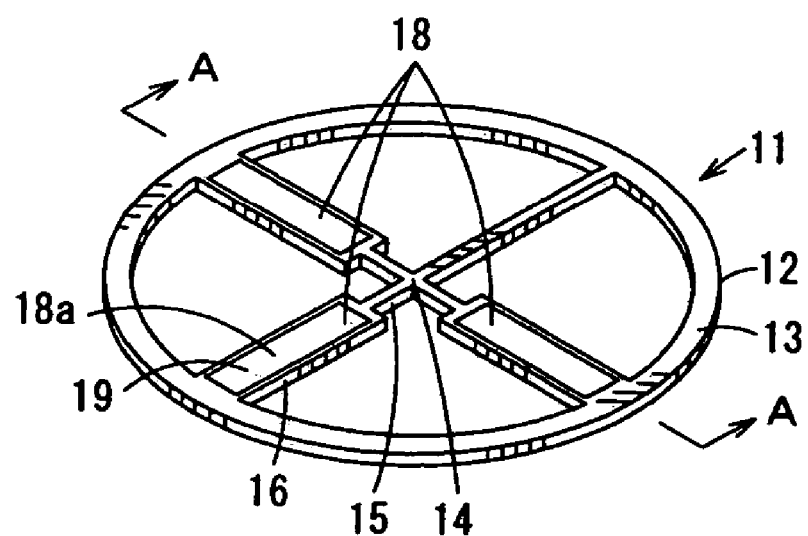
Figure 2:
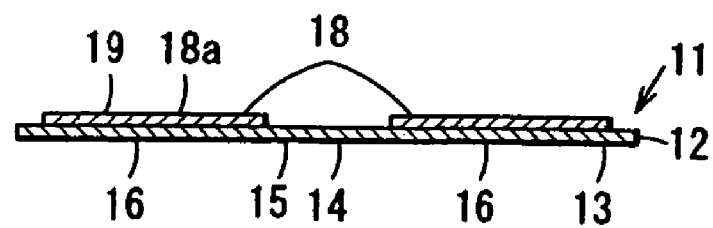
FIG. 2 is a cross sectional view taken along line A—A in FIG. 1.

FIG. 1 and FIG. 2 show one example of a reticle, where FIG. 1 is a perspective view and FIG. 2 is a cross sectional view taken along the line A—A in FIG. 1. The reticle 11 includes a thin reticle base 12, which is formed with an accurate reticle shape by, for example, press working a metal plate or electroforming a metal foil. The reticle base 12 may be made of materials other than metal, such as a resin material.

The reticle base 12 includes a peripheral ring 13 and a sight 14, which is arranged in the opened part of the ring 13 with a cross-like shape. A narrow portion 15 having a decreased width is formed at the central intersecting region of the sight 14. A wide portion 16 having a width greater than that of the narrow portion 15, except for one part, is formed at the outer side of the central intersecting region.

A phosphorescent pigment 18 is applied to the surface one side of the reticle 11. More specifically, a phosphorescent pigment layer 18a is printed or drawn on the surface of the reticle 11 with the phosphorescent pigment 18. The phosphorescent pigment layer 18a forms a light-emitting surface 19. The phosphorescent pigment 18 may be applied entirely or partially to the surface of the reticle 11. In the present embodiment, the phosphorescent pigment 18 is not applied to the ring 13 and the narrow portion 15 of the sight 14 in the reticle 11, but is applied to the wide portion 16 of the sight 14.

The phosphorescent pigment 18 applied to the surface of the reticle 11 contains at least one phosphor selected from $SrAl_2O_4$: Eu, Dy (emission color, green; emission peak, 520 nm); $Sr_4Al_{14}O_{25}$: Eu, Dy (emission color, blue; emission peak: 490 nm); or $CaAl_2O_4$: Eu, Nd (emission color, purple; emission peak, 440 nm). These phosphors, which are not radioactive, are aluminate phosphors that glow continuously for a long period of time after being energized by light, or after being excited.

The phosphorescent pigment 18 may contain, in addition to at least one of the phosphors, another substance, for example, a further pigment, dye, or phosphor. In particular, it is preferred that a phosphorescent pigment using $SrAl_2O_4$: Eu, Dy, which is visually the brightest, as a main component (product name: LUMINOVA, manufactured by Nemoto & Co., Ltd.) be used.

Furthermore, it is preferred that the phosphorescent pigment 18 applied to the surface of the reticle 11 have a particle diameter at D50 that is no smaller than 1.5 µm and no greater than 10 µm. The value of D50 refers to the particle diameter in which the cumulative volume value from the fine side amounts to 50% of the entire volume. The particle size distribution is measured using a laser diffraction dispersion technique. In other words, when the particle diameter in which the cumulative volume value from the fine side is 50%, the particle diameter is in a range that is no smaller than 1.5 µm and no greater than 10 µm. Similarly, the value at D90, for example, refers to a particle diameter in which the cumulative volume value amounts to 90% of the entire volume.

When the particle diameter of the phosphorescent pigment 18 is fine and smaller than 1.5 µm at D50, the luminance of the phosphorescent pigment 18 significantly decreases and lowers visibility in, for example, a dark place. On the other hand, when the particle diameter of the phosphorescent pigment 18 is coarse and greater than 10 µm at D50, the light-emitting surface 19 becomes rough. Thus, it becomes difficult to apply the phosphorescent pigment 18 to the reticle 11 with a microscopic and sharp shape. Further, irregularities appear near the periphery of the applied phosphorescent pigment 18 and lower the visibility of the reticle 11. It is thus preferred that the particle diameter of the phosphorescent pigment 18 be adjusted to be no smaller than 1.5 µm and no greater than 10 µm.

It is preferred that the amount of the phosphorescent pigment 18 applied to the surface of the reticle 11 be no less than 1.2 mg/cm$^2$ and no greater than 50 mg/cm$^2$. The amount of the phosphorescent pigment 18 is the mass of the phosphorescent pigment 18 per unit area and does not include the mass of, for example, a medium or a vehicle additionally used for application of the phosphorescent pigment 18.

When the application amount of the phosphorescent pigment 18 is less than 1.2 mg/cm$^2$, the luminance of the light-emitting surface 19 decreases and lowers visibility in for example, a dark place. On the other hand, when the application amount of the phosphorescent pigment 18 is greater than 50 mg/cm$^2$, the luminance of the light-emitting surface 19 saturates and thus there is no point in applying more phosphorescent pigment 18. Therefore, it is preferred that the application amount of the phosphorescent pigment 18 be no less than 1.2 mg/cm$^2$ and no more than 50 mg/cm$^2$.

Figure 3:
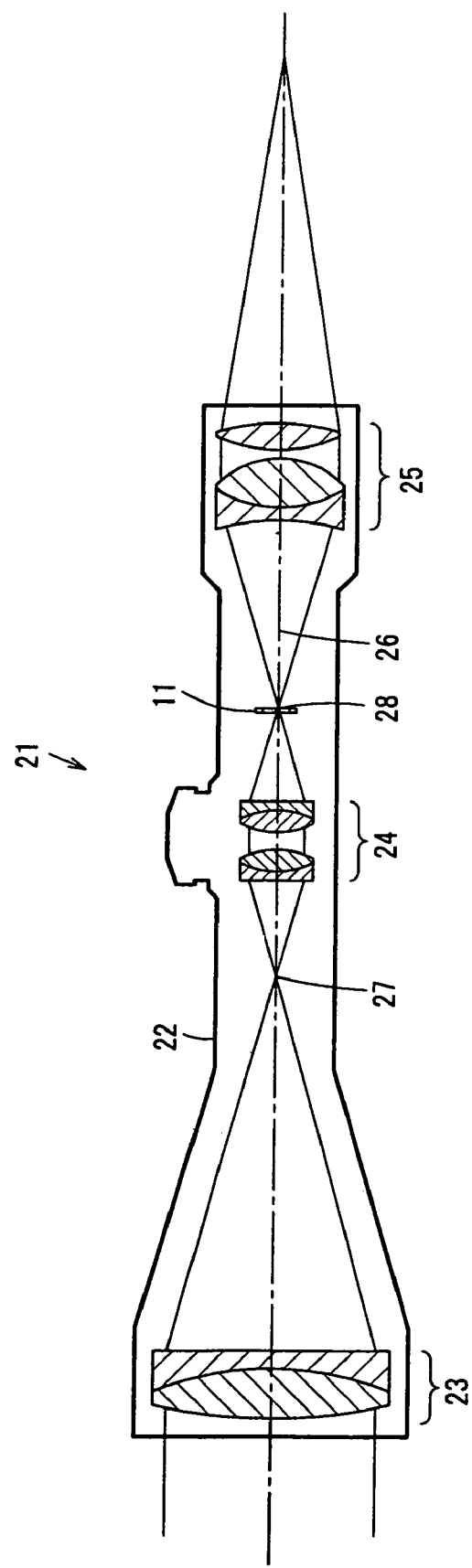
FIG. 3 is a schematic view showing a riflescope, as one example of an optical instrument, provided with the reticle.

A riflescope 21 is shown in FIG. 3 as one example of an optical instrument provided with the reticle 11. The riflescope 21 has a cylindrical scope body 22, which incorporates an optical system 26 including an objective lens 23, erecting lenses 24, and an ocular lens 25. A first focal point 27 is located between the objective lens 23 and the erecting lenses 24, and a second focal point 28 is located between the erecting lenses 24 and the ocular lens 25. The reticle 11 is located at the second focal point 28 in the optical system 26. The phosphorescent pigment 18 is applied to the surface facing towards the ocular lens 25.

When the riflescope 21 is used in the dark, such as at dusk, for example, a flashlight (not shown) is used to irradiate the phosphorescent pigment 18 of the reticle 11 with light, in advance, through the ocular lens 25. The light excites the phosphorescent pigment 18 and causes gradual emission of energy in the form of light from the phosphorescent pigment 18. Thus, the phosphorescent pigment 18 continues to emit light for a long period of time. Since the phosphorescent pigment 18 applied to the reticle 11 emits light for a long period of time after being excited, the reticle 11 maintains satisfactory visibility over a long period of time even in a dark place. As a result, the riflescope 21 enables a clear aim to be taken in the dark.

The position of the reticle 11 in the riflescope 21 may be at either the second focal point 28 or the first focal point 27. However, it is preferred that the reticle 11 be located at the second focal point 28, which is closer to the ocular lens 25. This would make the reticle 11 easier to excite and easier to observe.

Figure 4:
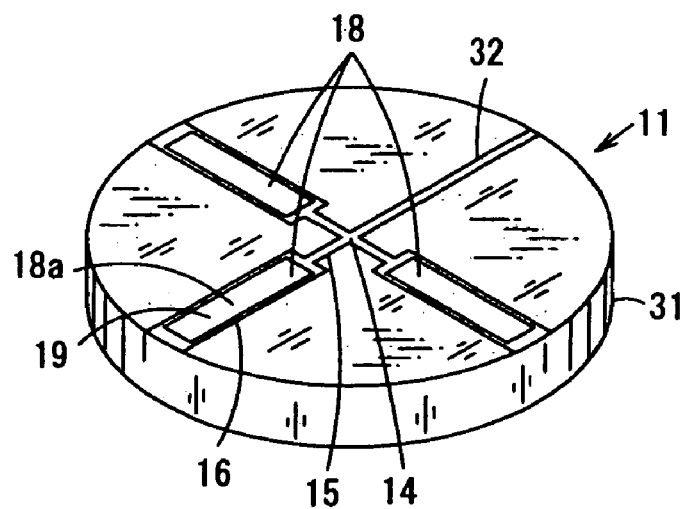
FIG. 4 is a perspective view showing a reticle according to a further embodiment that has a transparent base.

FIG. 4 shows a reticle 11 of a further embodiment. The reticle 11 includes a transparent base 31 made of a transparent material, such as a glass or a polymethyl methacrylate resin. The reticle 11 is formed by directly printing or drawing a cross-like reticle pattern 32 on the surface of one side of the transparent base 31 with a dye or a pigment. The phosphorescent pigment 18 is applied partially to the surface of the reticle 11. The reticle pattern 32 is printed or drawn on the surface of the phosphorescent pigment 18 to form a phosphorescent pigment layer 18a. In this case, the phosphorescent pigment 18 may be applied entirely or partially to the surface of the reticle pattern 32. In the same manner as the reticle 11 shown in FIG. 1, the reticle 11 may also be applied to the optical system 26 in the riflescope 21 shown in FIG. 5.

Figure 5:
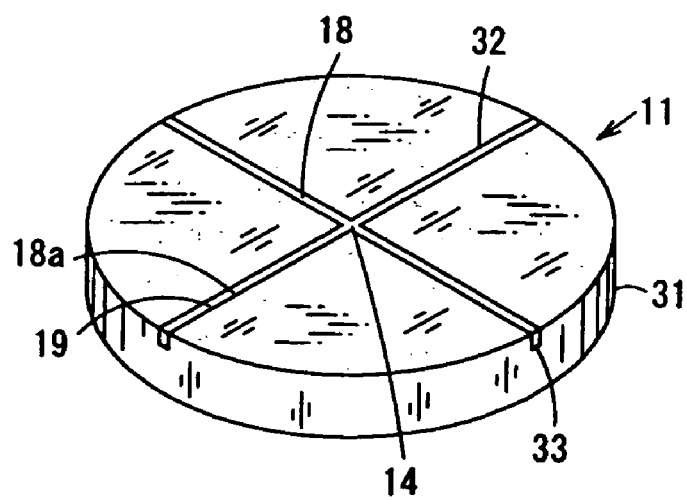
FIG. 5 is a perspective view showing a reticle according to a further embodiment that includes a transparent base.

FIG. 5 shows a reticle 11 of a further embodiment. The reticle 11 is provided with linear grooves 33 formed in a cross-like manner on the surface of one side of a transparent base 31, which is similar to that of the embodiment shown in FIG. 4. The reticle 11 is formed by arranging the grooves 33 in a cross-like manner to configure a cross-like reticle pattern 32. The phosphorescent pigment 18 is applied to the inside of the grooves 33, or filled in the grooves 33, to form a phosphorescent pigment layer 18a. In the same manner as the reticle 11 shown in FIG. 1, the reticle 11 in FIG. 5 may also be applied to the optical system 26 of the riflescope 21 shown in FIG. 3.

The reticle 11 may also be directly printed to or directly drawn on a transparent base 31, similar to that of the embodiments shown in FIGS. 4 and 5, with the phosphorescent pigment 18.

An example of the above preferred embodiments will now be described.

The reticle 11 had the same structure as the reticle 11 shown in FIG. 1 and FIG. 2 and included a reticle base 12 made from a metal foil. A nickel foil having a thickness of 10 µm was used as the metal foil and electroformed to obtain the reticle shape shown in FIG. 1. One example of the dimensions of such reticle 11 is the inner diameter of the ring 13 being about 17 mm, the width of the narrow portion 15 being about 0.05 mm, and the width of the wide portion 16 being about 0.24 mm.

Figure 6:
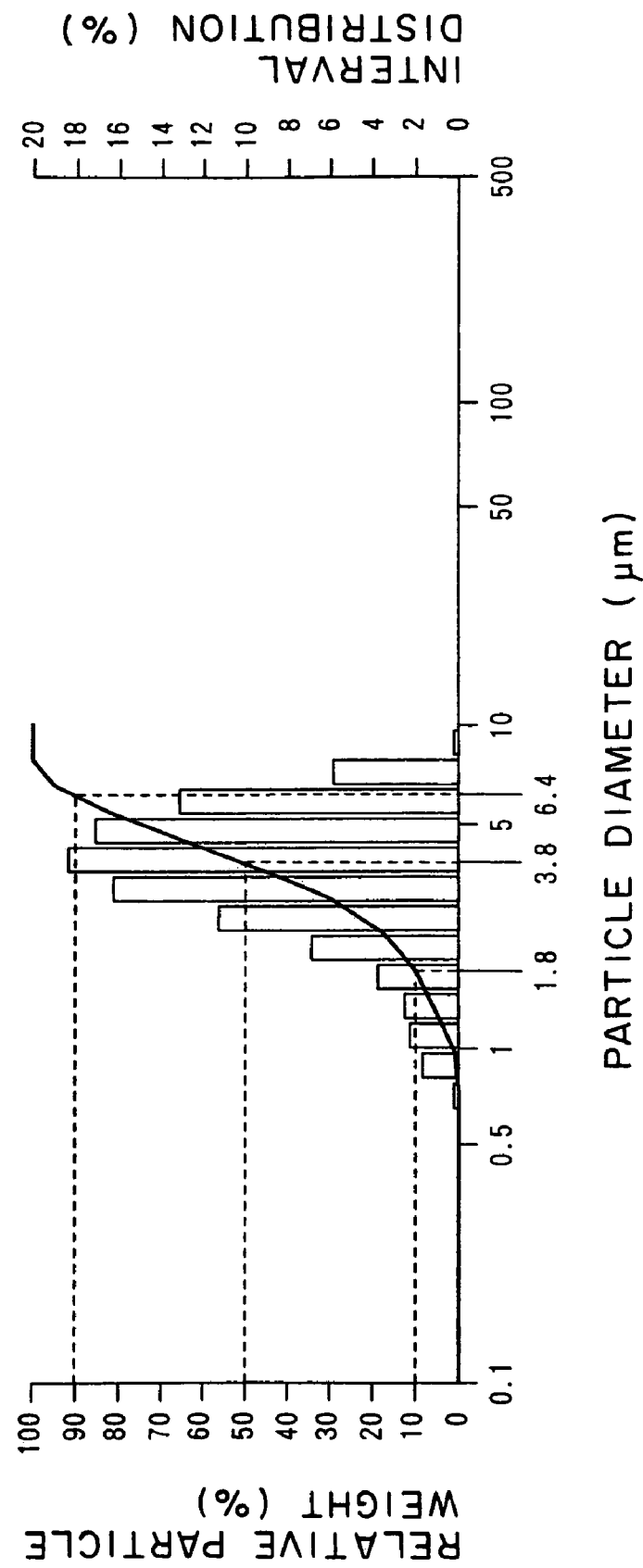
FIG. 6 is a graph showing particle size distribution when the particle diameter of phosphorescent pigment is D10=1.8 µm, D50=3.8 µm, D90=6.4 µm.

The phosphorescent pigment 18 was applied to the metal foil reticle 11 by performing screen printing. Phosphorescent pigment of which main component was $SrAl_2O_4$: Eu, Dy (product name: LUMINOVA manufactured by Nemoto & Co., Ltd.) was prepared as the phosphorescent pigment 18. A laser diffraction particle size analyzer (SALD-2100, manufactured by Shimadzu Corporation) was used to measure the selected phosphorescent pigment 18, which had a particle diameter of 1.8 µm at D10, 3.8 µm at D50, and 6.4 µm at D90. The particle size distribution of the phosphorescent pigment 18 is shown in FIG. 6.

The phosphorescent pigment 18 was mixed with an acrylic resin binder at a compounding ratio of 10:8 and then diluted with a diluting agent of butyl acetate and xylene to obtain a screen printing paste. Using the screen printing paste, screen printing was performed on the metal foil reticle 11 using a #250 mesh stencil to apply the phosphorescent pigment 18 to the reticle 11. The printing was performed so that the amount of the phosphorescent pigment 18 applied to the reticle 11 was 10 mg/cm$^2$.

The reticle 11 to which surface the phosphorescent pigment 18 was applied had a microscopic, accurate, and sharp shape that had superior visibility even in a dark place. Further, the sharp periphery of the light-emitting surface 19 enabled a clear aim.

Figure 7:
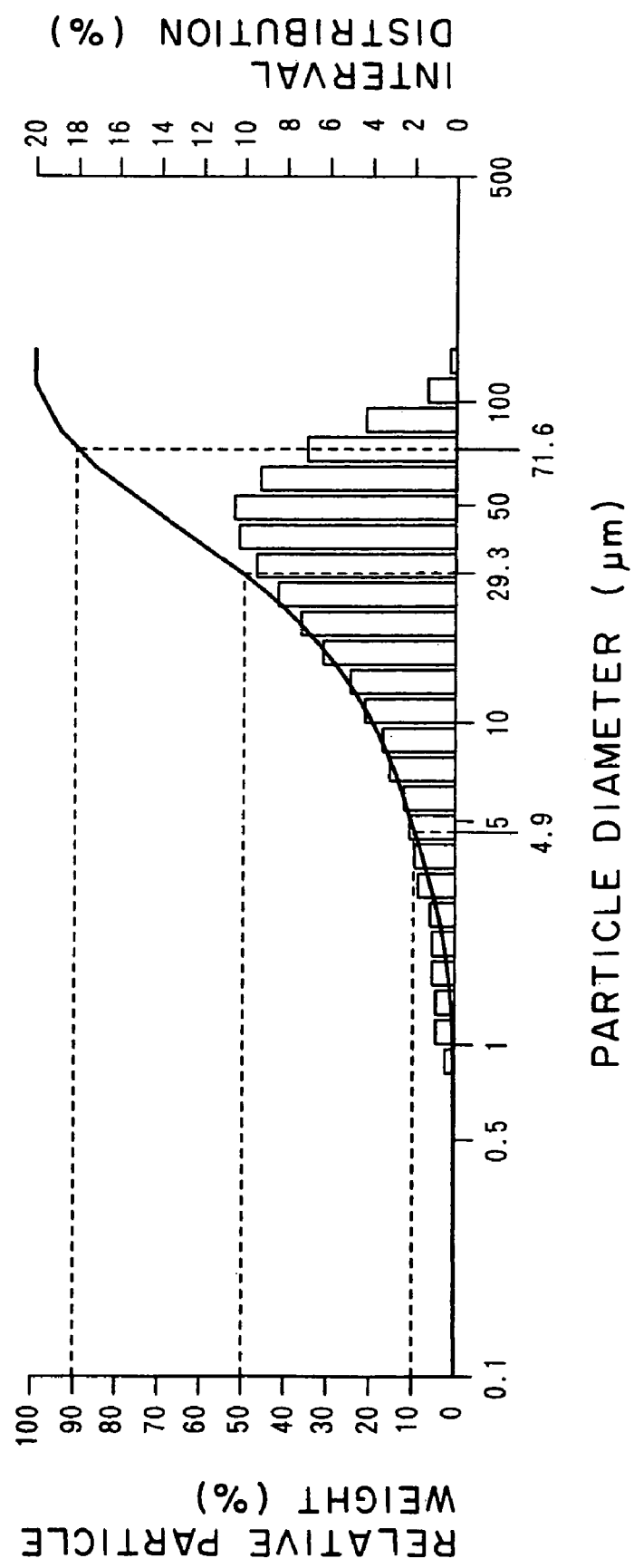
FIG. 7 is a graph particle size distribution when the particle diameter of phosphorescent pigment is D10=4.9 µm, D50=29.3 µm, D90=71.6 µm.
Figure 8A:
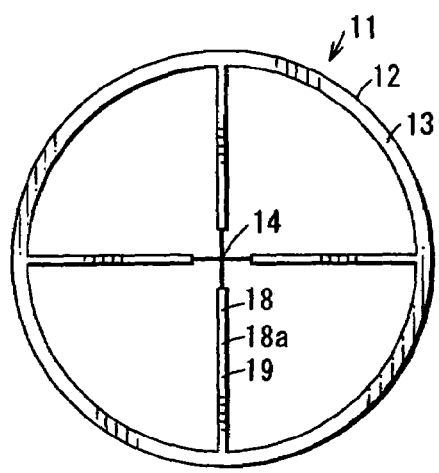
FIGS. 8(a) to 8(e) are front views each showing other examples of a reticle including a reticle base.
Figure 8B:
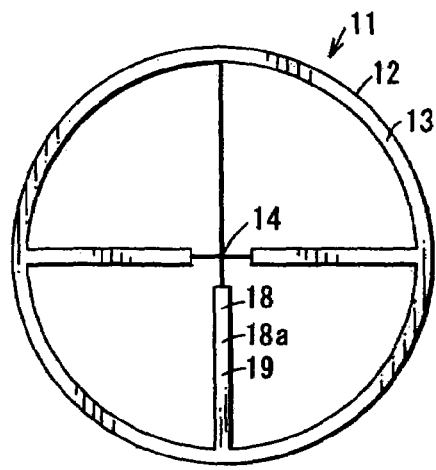
Figure 8C:
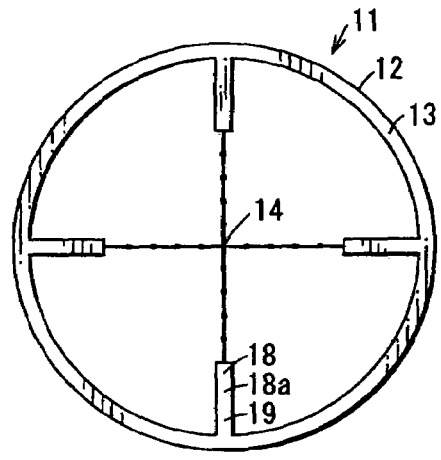
Figure 8D:
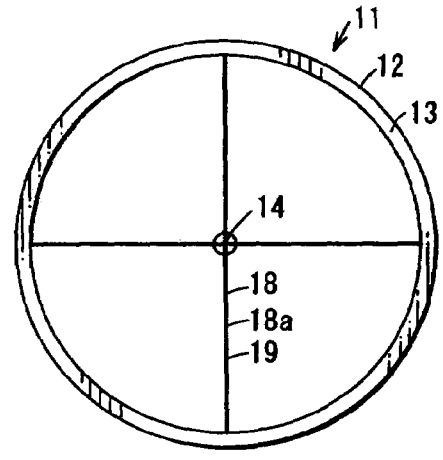
Figure 8E:
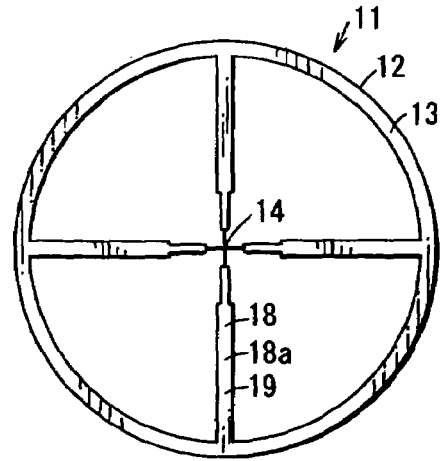

As a comparative example, phosphorescent pigment 18 having a particle diameter of 4.9 μm at D10, 29.3 μm at D50, and 71.6 μm at D90 was selected and applied to the reticle 11. Other conditions were the same as the above example. The particle diameter corresponds to the particle size distribution of a common aluminate phosphorescent phosphor. The particle size distribution of the phosphorescent pigment 18 is shown in FIG. 7.

In the comparative example, the particle diameter of the phosphorescent pigment 18 was too coarse. Thus, a microscopic, accurate, and sharp shape could not be formed on the surface of the reticle 11. As a result, irregularities appeared at the periphery of the light-emitting surface 19 making it difficult to aim. Accordingly, the comparative example was not practical.

The conditions for the particle diameter of the phosphorescent pigment 18 were changed to obtain the reticle 11 in the same manner. It was confirmed that the suitable range for the particle diameter was no smaller than 1.5 μm and no greater than 10 μm at D50 and no smaller than 2.5 μm and no greater than 20 μm at D90.

When the particle diameter of the phosphorescent pigment 18 was fine and smaller than 1.5 μm at D50 and smaller than 2.5 μm at D90, the luminance of the phosphorescent pigment 18 decreased significantly and lowered visibility in dark places. When the particle diameter of the phosphorescent pigment 18 was coarse and greater than 10 μm at D50 and greater than 20 μm at D90, the light-emitting surface 19 was rough. Thus, the application of the phosphorescent pigment 18 to the reticle 11 in a microscopic and sharp shape was difficult, and irregularities appeared at the periphery of the applied phosphorescent pigment 18. The light-emitting surface 19 was therefore unclear. Accordingly, the preferred range of the particle diameter was no smaller than 1.5 μm and no greater than 10 μm at D50 and no smaller than 2.5 μm and no greater than 20 μm at D90.

Similarly, when the reticle 11 was obtained under the same conditions as the above embodiments but with a different application amount of the phosphorescent pigment 18, the suitable amount of the phosphorescent pigment 18 to be applied was no less than 1.2 mg/cm$^2$ and no more than 50 mg/cm$^2$.

When the amount of the phosphorescent pigment 18 to be applied was less than 1.2 mg/cm$^2$, the luminance of the light-emitting surface 19 decreased and lowered visibility in dark places. When the application amount of the phosphorescent pigment 18 was more than 50 mg/cm$^2$, the luminance of the light-emitting surface 19 saturated. Thus, there is no point in applying more than 50 mg/cm$^2$. Accordingly, the preferred application amount of the phosphorescent pigment 18 is no less than 1.2 mg/cm$^2$ and no more than 50 mg/cm$^2$.

As described above, the phosphorescent pigment 18 applied to the reticle 11 contains at least one phosphor selected from SrAl$_2$O$_4$: Eu, Dy; Sr$_4$Al$_{14}$O$_{26}$: Eu, Dy; and CaAl$_2$O$_4$: Eu, Nd. Thus, the phosphorescent pigment 18 emits light over a long period of time after being excited and ensures satisfactory visibility over a long period of time, even in dark places, without using a light source or a radioactive substance.

When the particle diameter of the phosphorescent pigment 18 is no smaller than 1.5 μm and no greater than 10 μm at D50, the phosphorescent pigment 18 is applied with an accurate and sharp shape. Further, the phosphorescent pigment 18 provides a satisfactory outer appearance and improves visibility even in dark places.

Furthermore, when the application amount of the phosphorescent pigment 18 is no less than 1.2 mg/cm$^2$ and no more than 50 mg/cm$^2$, an appropriate luminance is obtained for the light-emitting surface 19 of the reticle 11. This improves visibility even in dark places.

In the riflescope 21 using the reticle 11, the reticle 11 has improved visibility when used in the dark, such as at dusk or in the nighttime or when aiming at a dark-colored target.

In addition to the riflescope 21, examples of an optical instrument using the reticle 11 include a targeting scope for various kinds of firearms, a monocular, a binocular, a surveying instrument, and a spotting scope. Further, the reticle 11 may also be applied to an optical instrument used in the dark, such as at dusk or in the nighttime, or an optical instrument for observing a dark-colored object.

In the reticle 11 including the reticle base 12 made from a metal plate, a metal foil, or other materials, the reticle shape is not limited to that shown in FIG. 1 and may be formed to have a reticle shape corresponding to various kinds of optical instruments, as shown in FIGS. 8(a) to 8(e). The reticle shape is also not limited to such illustrated shapes. In such cases, the reticle is printed to or drawn on the reticle base 12 with the phosphorescent pigment 18 to apply the phosphorescent pigment 18 thereto.

Furthermore, the reticle 11 of the transparent base 31, which is made from, for example, a glass or a polymethyl methacrylate resin, is not limited to the shape of the reticle pattern shown in FIG. 3 and FIG. 4 and may be formed to have a shape corresponding to various kinds of optical instruments, as shown in FIGS. 9(a) to 9(g). The reticle shape is also not limited to such illustrated shapes. In such cases, the reticle pattern 32 may be printed to or drawn on the transparent base 31 with the phosphorescent pigment 18, directly formed on the transparent base 31 with the phosphorescent pigment 18, or formed by applying the phosphorescent pigment 18 in the groove 33.

Having described preferred embodiments of the invention with reference to the accompanying drawings, it is to be understood that the invention is not limited to those precise embodiments, and that various changes and modifications may effected therein by one skilled in the art without departing from the scope or spirit of the invention as defined in the appended claims.

What is claimed is:

1. An optical instrument having a optical system that includes an ocular lens and a reticle located in the optical system, wherein:

the reticle comprises a reticle base wherein said reticle base includes a sight, a phosphorescence pigment is applied to a surface of the sight facing the ocular lens, wherein the phosphorescence pigment is applied to an inside area that is located further inside than an edge or periphery, apart from the periphery on the surface of the sight of the reticle base, light irradiated from outside through the ocular lens excites the phosphorescence pigment of the reticle, the phosphorescence pigment contains at least one of a phosphor selected from SrAl$_2$O$_4$: Eu, Dy; Sr$_4$Al$_{14}$O$_{25}$: Eu, Dy; and CaAl$_2$O$_4$: Eu, Nd; and the phosphorescence pigment has a particle diameter that is no smaller than 1.5 μm and no greater than 10 μm at D50.

2. An optical instrument having a optical system that includes an ocular lens and a reticle located in the optical system, wherein:

the reticle comprises a reticle base wherein said reticle base includes a sight, a phosphorescence pigment is applied to a surface of the sight facing the ocular lens, wherein the phosphorescence pigment is applied to an inside area that is located further inside than an edge or periphery, apart from the periphery on the surface of the sight of the reticle base, light irradiated from outside through the ocular lens excites the phosphorescence pigment of the reticle, the phosphorescence pigment contains at least one of a phosphor selected from $SrAl_2O_4$: Eu, Dy; $Sr_4Al_{14}O_{25}$: Eu, Dy; and $CaAl_2O_4$: Eu, Nd; and the phosphorescence pigment is applied in an amount that is no less than 1.2 $mg/cm^2$ and no more than 50 $mg/cm^2$.

3. An optical instrument having a optical system that includes an ocular lens and a reticle located in the optical system, wherein:

the reticle comprises a reticle base wherein said reticle base includes a sight, a phosphorescence pigment is applied to a surface of the sight facing the ocular lens, wherein the phosphorescence pigment is applied to an inside area that is located further inside than an edge or periphery, apart from the periphery on the surface of the sight of the reticle base, light irradiated from outside through the ocular lens excites the phosphorescence pigment of the reticle, the phosphorescence pigment contains at least one of a phosphor selected from $SrAl_2O_4$: Eu, Dy; $Sr_4Al_{14}O_{25}$: Eu, Dy; and $CaAl_2O_4$: Eu, Nd;

the phosphorescence pigment has a particle diameter that is no smaller than 1.5 μm and no greater than 10 μm at D50; and the phosphorescence pigment is applied in an amount that is no less than 1.2 $mg/cm^2$ and no more than 50 $mg/cm^2$.

* * * * *